June 23, 1953     E. E. JELLISON     2,642,915
MOTOR VEHICLE WHEEL TRACTION CHAIN
Filed May 3, 1950
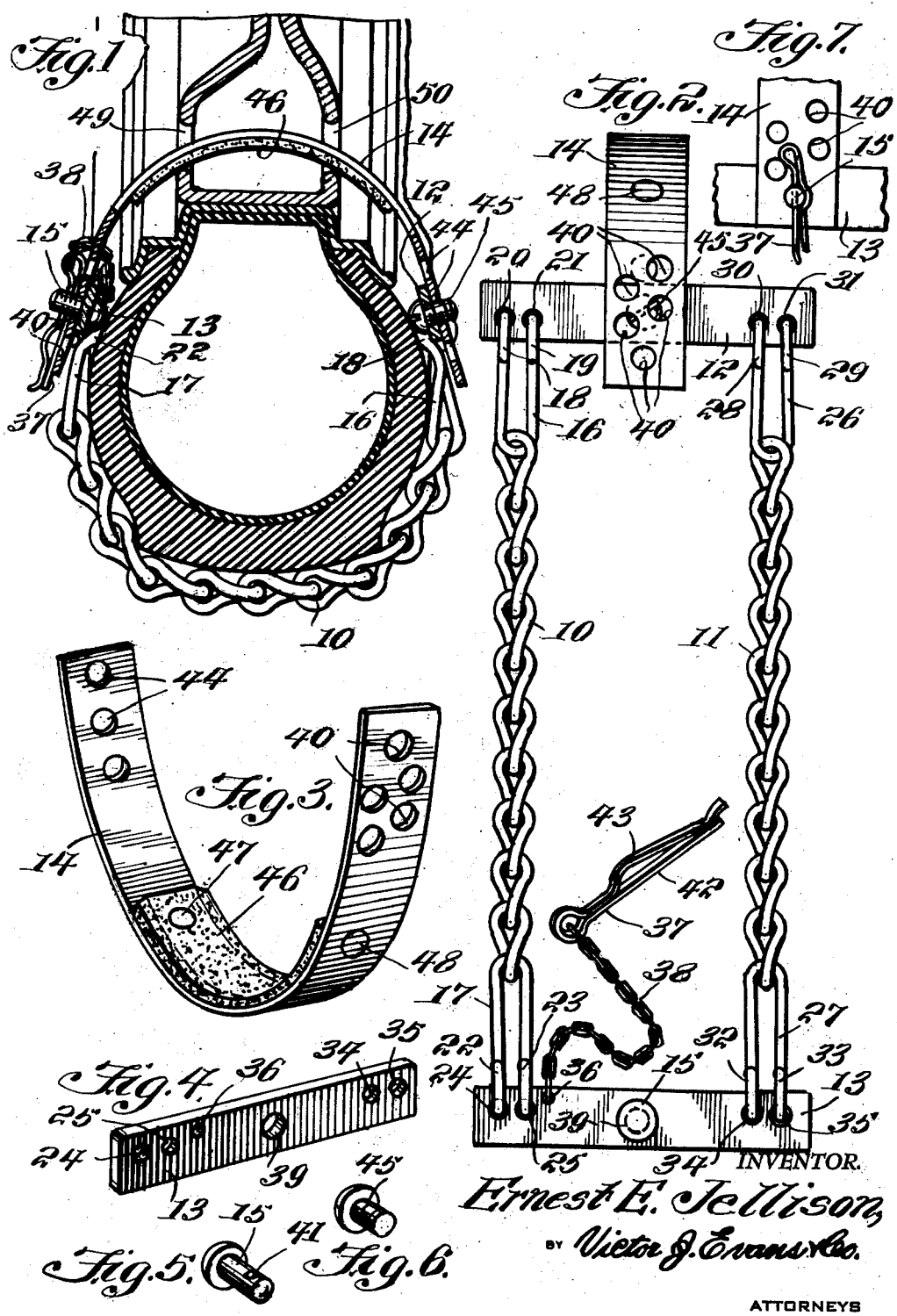
INVENTOR.
Ernest E. Jellison,
BY Victor J. Evans & Co.
ATTORNEYS Patented June 23, 1953

2,642,915

UNITED STATES PATENT OFFICE 2,642,915

MOTOR VEHICLE WHEEL TRACTION CHAIN

Ernest E. Jellison, Twin Falls, Idaho

Application May 3, 1950, Serial No. 159,824

1 Claim. (Cl. 152—237)

This invention relates to non-skid or traction devices for motor vehicle wheels particularly of the type where individual units are placed through openings in the felly or rim, and in particular this invention relates to a pair of chains with the ends attached to parallel bars and with the chains supported by the bars around the outer surface of a tire by a padded band extended through the rim of the wheel and with the ends of the band attached to the bars.

The purpose of this invention is to provide an improved traction or non-skid chain that may readily be applied to a wheel and readily removed therefrom and that provides double gripping elements to facilitate holding the wheel in mud, snow, ice and the like.

Various types of single unit non-skid chains have been provided where the chains are strapped or otherwise attached to the wheel but chains of this type have not been universally adopted because the single chain is not sufficient for gripping and the devices of this type not only scratch the rims of the wheels but are difficult to apply. With this thought in mind this invention contemplates a pair of non-skid or gripping chains carried by bars and with the bars attached to bands to facilitate installing the chains on the wheel and also to improve the gripping action of chains of this type.

The object of this invention is, therefore, to provide means for constructing an improved traction or non-skid chain unit for motor vehicle wheels whereby each unit contains a plurality of chains and may readily be applied to the wheel.

Another object of the invention is to provide an improved non-skid or traction chain unit for motor vehicle wheels that may be applied to wheels without changing the design or construction of the wheel.

A further object of the invention is to provide an improved traction or non-skid chain for motor vehicle wheels in which the chains are provided in independent units, which is of a simple and economical construction.

With these and other objects and advantages in view the invention embodies a pair of chains having loops at the ends by which the chains are mounted in openings in the ends of parallel bars and a band with the ends adjustably mounted on the bars and with means for removably connecting one of the ends of the band to one of the bars to facilitate installation and removal of the chain.

Other features and advantages of the invention will appear from the following description taken in connection with the drawings wherein:

Figure 1 is a longitudinal section through the unit showing a tire and rim of a wheel in section and showing the traction or non-skid chain unit mounted on the wheel.

Figure 2 is a plan view of the unit with the parts in the open position.

Figure 3 is a detail illustrating the band by which bars at the ends of the chains are mounted on the tire through openings in the rim of a wheel.

Figure 4 is a detail showing one of the bars to which the ends of the chains are attached.

Figure 5 is a detail illustrating a connecting pin having a cotter pin opening therein by which the outer end of the band is attached to one of the bars.

Figure 6 is a detail illustrating a screw for attaching the opposite end of the band to one of the bars.

Figure 7 is a detail showing a cotter pin extended through the pin shown in Figure 5 with the end of the band attached to one of the bars.

Referring now to the drawings wherein like reference characters denote corresponding parts the improved traction or non-skid chain of this invention includes chains 10 and 11 attached to bars 12 and 13 with a band 14 for mounting the bars and chains on a wheel, and a pin 15 by which the outer end of the band is temporarily attached to one of the bars.

The chain 10 is provided with U-shaped loops 16 and 17 by which the ends of the chain are attached to the bars 12 and 13, respectively, the loops 16 having eyes 18 and 19 positioned in openings 20 and 21 and the loop 17 having eyes 22 and 23 positioned in openings 24 and 25, respectively of the band 13. The chain 11 is provided with similar loops 26 and 27, the loop 26 having eyes 28 and 29 positioned in openings 30 and 31 and the loop 27 having eyes 32 and 33 that are positioned in openings 34 and 35.

The bar 13, shown in detail in Figure 4, is also provided with an opening 36 through which a cotter pin 37 is attached to the bar 13 by a chain 38.

The bar 13 is provided with a centrally positioned opening 39 in which the pin 15 is positioned and with the pin 15 extended through the opening 39 and also through one of the openings 40 in the band 14 the cotter pin 37 is inserted through an opening 41 in the pin as shown in Figure 5.

In the design shown the cotter pin is provided with a straight leg 42 and a leg having an arcuate section 43 therein, however, it will be understood that a cotter pin or other fastening element of any type or design may be used.

The opposite end of the band 14 is provided with a plurality of openings 44 which are threaded to receive a screw such as the screw 45 shown in Figure 6, with the screw extended through the bar 12 as shown in Figure 1.

The inner surface of the band 14 is provided with a pad 46 that is secured in position by rivets 47 and 48.

With the parts arranged in this manner the traction or non-skid units are mounted on a wheel with the chains extended around the outer surface of a tire, as shown in Figure 1, and the band 14 inserted through openings 49 and 50 in the rim or felly with the inner end attached to one of the bars by the screw 45 and with the chain in position the outer end is placed over the outer end of the pin 15 and the cotter pin, which is suspended by the chain 38 is inserted in the opening 41 of the pin. With the chains mounted in this manner they may readily be removed after use by removing the cotter pin.

It will be understood that modifications may be made in the design and arrangement of the parts without departing from the spirit of the invention.

What is claimed is:

In a motor vehicle wheel traction chain, the combination which comprises a pair of chains positioned in parallel relation, a pair of bars connecting the ends of the chains and positioned perpendicularly to the chains, said bars each having an opening therethrough and said openings positioned midway between the connections of the chains to the bars, an arcuate band having a pad of resilient material on the inner surface positioned to extend around the felly of a wheel with said chains extended over a tire on the wheel, said band having a plurality of spaced openings in the ends and said openings positioned to register with the openings in the bars positioned midway between the chains, the openings in one end of the band being staggered providing means for adjusting the length of the band to compensate for tires and wheels of different sizes and the openings in the opposite end of the band being threaded, a screw extended through the opening positioned midway between the chains of one bar and threaded into one of the threaded openings of the band, a pin extended through the opening positioned between the chains of the other bar and extended through one of the staggered openings of the band, and a cotter pin carried by a chain anchored to the bar in which the pin is positioned and having a leg extended through said pin for detachably retaining the parts in assembled relation.

ERNEST E. JELLISON.

References Cited in the file of this patent
UNITED STATES PATENTS

| Number | Name | Date |
|---|---|---|
| 1,522,643 | Miller | Jan. 13, 1925 |
| 1,643,586 | Ratigan | Sept. 27, 1927 |
| 1,801,264 | Cooke | Apr. 21, 1931 |
| 1,903,129 | Peterson | Mar. 28, 1933 |
| 2,192,419 | Storrs | Mar. 5, 1940 |
| 2,239,730 | Moore | Apr. 29, 1941 |
| 2,420,804 | Wenzel | May 20, 1947 |
| 2,577,142 | McGuinnes | Dec. 4, 1951 |